United States Patent
Kim et al.

(10) Patent No.: US 10,504,263 B2
(45) Date of Patent: Dec. 10, 2019

(54) ADAPTIVE HIGH DYNAMIC RANGE (HDR) TONE MAPPING WITH OVERLAY INDICATION

(71) Applicant: Samsung Electronics Co., Ltd., Suwon-si, Gyeonggi-do (KR)

(72) Inventors: Yeong-Taeg Kim, Irvine, CA (US); Seongnam Oh, Irvine, CA (US); Soojung Hyun, Tustin, CA (US); Li Tao, Irvine, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/005,474

(22) Filed: Jun. 11, 2018

(65) Prior Publication Data

US 2019/0043233 A1 Feb. 7, 2019

Related U.S. Application Data

(60) Provisional application No. 62/540,012, filed on Aug. 1, 2017.

(51) Int. Cl.
| | | |
|---|---|---|
| *G06T 11/60* | (2006.01) | |
| *G06T 5/00* | (2006.01) | |
| *G06T 5/40* | (2006.01) | |
| *G06T 5/50* | (2006.01) | |

(52) U.S. Cl.
CPC .............. *G06T 11/60* (2013.01); *G06T 5/007* (2013.01); *G06T 5/008* (2013.01); *G06T 5/40* (2013.01); *G06T 5/50* (2013.01); *G06T 2207/10024* (2013.01); *G06T 2207/20208* (2013.01)

(58) Field of Classification Search
CPC ...................................... G06T 11/60
USPC ....... 348/599, 665, 567, 520, 706, 716, 714, 348/36, 47, 65, 77, 143, 274; 710/1, 2, 3
See application file for complete search history.

(56) References Cited

U.S. PATENT DOCUMENTS

| | | | |
|---|---|---|---|
| 9,076,224 B1* | 7/2015 | Shah | G06T 5/009 |
| 9,087,382 B2 | 7/2015 | Zhai et al. | |
| 9,503,320 B2* | 11/2016 | Miller | H04L 41/0803 |
| 9,842,418 B1* | 12/2017 | Crosby | G06T 11/60 |
| 9,978,130 B2 | 5/2018 | Sun | |
| 2002/0026642 A1* | 2/2002 | Augenbraun | H04N 7/17318 725/109 |

(Continued)

FOREIGN PATENT DOCUMENTS

| | | |
|---|---|---|
| JP | 5317825 B2 | 10/2013 |
| WO | 2016074999 A1 | 5/2016 |

OTHER PUBLICATIONS

International Search Report and Written Opinion dated Nov. 5, 2018 for International Application PCT/KR2018/008749 from Korean Intellectual Property Office, pp. 1-8, Republic of Korea.

*Primary Examiner* — Jefferey F Harold
*Assistant Examiner* — Mustafizur Rahman
(74) *Attorney, Agent, or Firm* — Sherman IP LLP; Kenneth L. Sherman; Steven Laut

(57) ABSTRACT

A method for video tone mapping includes receiving an overlay indication from an input data stream indicating whether a graphic is being overlaid on image data for a High Dynamic Range (HDR) scene. Based on the overlay indication, a hardware processor processes a video stream using a first tone mapping function to generate a first tone mapped video, or a second tone mapping function to generate a second tone mapped video.

20 Claims, 10 Drawing Sheets

(56) References Cited

U.S. PATENT DOCUMENTS

| | | | |
|---|---|---|---|
| 2005/0243176 A1* | 11/2005 | Wu | G06T 5/50 348/207.1 |
| 2009/0060315 A1* | 3/2009 | Harris | G01N 21/951 382/141 |
| 2009/0096937 A1* | 4/2009 | Bauer | B60R 1/12 348/739 |
| 2011/0316973 A1* | 12/2011 | Miller | G09G 3/003 348/43 |
| 2013/0129250 A1 | 5/2013 | Kokemohr | |
| 2014/0079335 A1 | 3/2014 | Sun | |
| 2014/0118541 A1* | 5/2014 | Lasko | G08B 13/19682 348/143 |
| 2014/0210847 A1* | 7/2014 | Knibbeler | G09G 5/006 345/589 |
| 2014/0341482 A1* | 11/2014 | Murphy-Chutorian | G06K 9/00677 382/284 |
| 2015/0170389 A1 | 6/2015 | Ming et al. | |
| 2015/0256860 A1* | 9/2015 | Kunkel | G06T 5/00 348/598 |
| 2015/0366442 A1* | 12/2015 | Amling | A61B 1/00193 348/47 |
| 2016/0005201 A1* | 1/2016 | Kunkel | H04N 9/67 345/589 |
| 2016/0080716 A1* | 3/2016 | Atkins | H04N 5/44504 348/599 |
| 2016/0381398 A1* | 12/2016 | Saxena | H04N 21/2353 348/39 |
| 2017/0091915 A1 | 3/2017 | McLaughlin et al. | |
| 2017/0111626 A1 | 4/2017 | Adsumilli et al. | |
| 2017/0228908 A1 | 8/2017 | Aiba et al. | |
| 2018/0061026 A1* | 3/2018 | Kozuka | G06T 5/009 |
| 2018/0220101 A1* | 8/2018 | Evans | H04N 7/0117 |
| 2018/0336669 A1* | 11/2018 | Mertens | G06T 5/007 |

\* cited by examiner

ADAPTIVE HIGH DYNAMIC RANGE (HDR) TONE MAPPING WITH OVERLAY INDICATION

CROSS-REFERENCE TO RELATED APPLICATIONS

This application claims the priority benefit of U.S. Provisional Patent Application Ser. No. 62/540,012, filed Aug. 1, 2017, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to graphic overlays on high-dynamic-range (HDR) scenes, and in particular, to providing an overlay graphics indication for HDR scenes for applying tone mapping (TM).

BACKGROUND

A graphic can be overlaid to an HDR scene having dynamic TM metadata at Blu-ray Disc player (BDP), set top box (STB), or broadcaster. No information about overlay graphics is currently delivered together with an HDR scene to a receiver where tone mapping occurs.

SUMMARY

One or more embodiments relate to providing an overlay graphics indication for HDR scenes for applying TM. In some embodiments, a method for video tone mapping includes receiving an overlay indication from an input data stream indicating whether a graphic is being overlaid on image data for a High Dynamic Range (HDR) scene. Based on the overlay indication, a hardware processor processes a video stream using a first tone mapping function to generate a first tone mapped video, or a second tone mapping function to generate a second tone mapped video.

In some embodiments, an apparatus comprises a memory storing instructions. At least one processor executes the instructions including a process configured to: receive an overlay indication from an input data stream indicating whether a graphic is being overlaid on image data for a High Dynamic Range (HDR) scene; and based on the overlay indication, process a video stream using a first tone mapping function to generate a first tone mapped video, or a second tone mapping function to generate a second tone mapped video.

In some embodiments, a non-transitory processor-readable medium that includes a program that when executed by a processor performs a method that comprises receiving, by a hardware processor, an overlay indication from an input data stream indicating whether a graphic is being overlaid on image data for an HDR scene. Based on the overlay indication, the hardware processor processes a video stream using a first tone mapping function to generate a first tone mapped video, or a second tone mapping function to generate a second tone mapped video.

These and other features, aspects and advantages of the one or more embodiments will become understood with reference to the following description, appended claims and accompanying figures.

DETAILED DESCRIPTION

Figure 1:
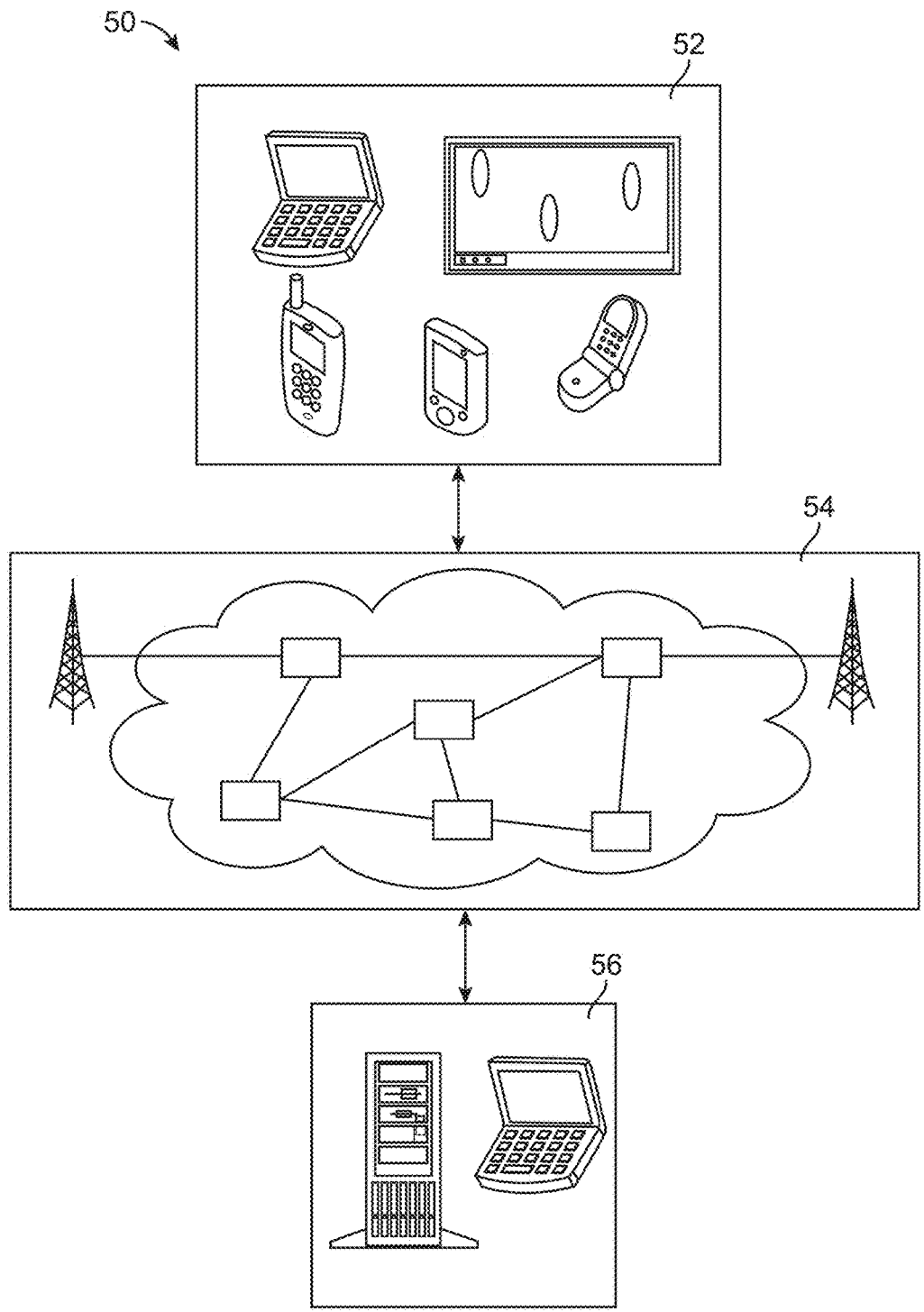
FIG. 1 shows an electronic system with an overlay enhancement mechanism, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Some embodiments provide an overlay graphics indication for high dynamic range (HDR) scenes for tone mapping (TM) applications. In some embodiments, a method for video tone mapping includes receiving an overlay indication from an input data stream indicating whether a graphic is being overlaid on image data for a High Dynamic Range (HDR) scene. Based on the overlay indication, a hardware processor processes a video stream using a first tone mapping function to generate a first tone mapped video, or a second tone mapping function to generate a second tone mapped video.

A person skilled in the art would appreciate that the format with which image information is expressed is not critical to some embodiments. For example, in some embodiments, image information is presented in the format of I(X, Y), where X and Y are two coordinates that define the location of a pixel in an image. Three-dimensional image information may presented by a format of I(X, Y, Z) with related information for color of the pixel, where X, Y, and Z are three coordinates that define the location of a pixel in an image. In one embodiment, the image information also includes an intensity or brightness element.

For expository purposes, the term "horizontal" as used herein refers to the horizontal direction seen when viewing the drawing as indicated by the figure designation of "FIG.". The term "vertical" refers to a direction perpendicular to the horizontal as just defined. Terms, such as "above", "below", "bottom", "top", "side", "higher", "lower", "upper", "over", and "under", are defined with respect to the horizontal, as shown in the figures.

The term "image" referred to herein may include a two-dimensional image, three-dimensional image, video frame, a computer file representation, an image from a camera, a video frame, or a combination thereof. For example, the image may be a machine readable digital file, a physical photograph, a digital photograph, a motion picture frame, a video frame, an x-ray image, a scanned image, or a combination thereof. The image may be generated from pixels arranged in a rectangular array. The image may include an x-axis along the direction of the rows and a y-axis along the direction of the columns. The term "image" may indicate a still image or a moving picture of a video, i.e., the latter indicating the video itself. The term "image" may include a partial or the entire screen image displayable on a display besides a still image (e.g., a photograph) or a video. In addition, the term "image" may also originally include a displayable screen image itself such as a user interface or a webpage besides a still image (e.g., a photograph) or a video.

The term "color gamut" indicates a color space region displayable in an image among the whole light region. For example, gamut information may vary according to by which one of red, green, and blue (GBR or RGB) and cyan, magenta, yellow, and black (CMYK) color systems the image is displayed. According to the gamut information, the image may be classified into a wide gamut image and a narrow gamut image. For example, the wide gamut image may indicate an image having a wide gamut and include an image having a digital cinema package (DCP), digital cinema initiatives (DCI), or Adobe RGB color system or an HDR image mastered with a high light intensity and a wide gamut. The narrow gamut image may indicate an image having a narrow gamut and include an image having a color level or an sRGB color system.

In general, the term "dynamic range" may indicate a ratio of a maximum value of a physically measured amount to a minimum value thereof. For example, a dynamic range of an image may indicate a ratio of a brightest part in the image to a darkest part therein. As another example, a dynamic range of a display apparatus may indicate a ratio of minimum brightness of light which may be emitted from a screen to maximum brightness thereof. In the real world, a dynamic range is from completed darkness close to 0 nit to very high brightness close to sunlight.

As a ratio of maximum brightness in an image to minimum brightness therein is higher, the image may be classified into a low dynamic range image, a standard dynamic range image, and a high dynamic range image. For example, an image having a bit depth of 16 bits or less for each of R, G, and B components of one pixel may represent a low dynamic range image. In addition, an image having a bit depth of 32 bits or more for each of R, G, and B components of one pixel may represent a low dynamic range image to a high dynamic range image.

When a high dynamic range image is displayed on a display apparatus having a low dynamic range without being corrected, the original intention of the high dynamic range image may be distorted and displayed. The term "tone mapping" (TM) may indicate an operation of converting a dynamic range of an image. TM is a technique used in image processing and computer graphics to map one set of colors to another to approximate the appearance of HDR images in a medium that has a more limited dynamic range. TM addresses the problem of strong contrast reduction from the scene radiance to the displayable range while preserving the image details and color appearance important to appreciate the original scene content. TM may indicate an operation of narrowing a dynamic range of an image. For example, the TM may indicate an operation of converting an HDR image into a low dynamic range image. In addition, the TM may indicate an operation of widening a dynamic range of an image. For example, the TM may indicate an operation of converting a low dynamic range image into an HDR image. When a dynamic range of an image is not included in a dynamic range of a display apparatus on which the image is displayed, the display apparatus may maintain the intention of an original image by using a tone-mapped image.

FIG. 1 shows an electronic system 50 with an overlay enhancement mechanism in some embodiments. The electronic system 50 includes a first device 52, such as a client or a server, connected to a second device 56, such as a client or server. The first device 52 may communicate with the second device 56 with a communication path 54, such as a wireless or wired network.

In one example, the first device 52 may be of any of a variety of display devices, such as ultra-high definition (UD), 4K (8K, etc.) display devices, such as a UD television (UDTV), 4K TV, 8K TV, tablet device, smart phone, personal digital assistant (PDA), a notebook computer, a liquid crystal display (LCD) system, a wearable device, mobile computing device, projection device, or other multi-functional displays or entertainment devices. The first device 52 may couple directly or indirectly to the communication path 54 to communicate with the second device 56 or may be a stand-alone device.

For illustrative purposes, the display system 50 is described with the first device 52 as a display device, although it is understood that the first device 52 may be a variety of different types of devices. For example, the first device 52 may also be a device for presenting images or a multi-media presentation. A multi-media presentation may be a presentation including sound, a sequence of streaming images or a video feed, or a combination thereof. As an example, the first device 52 may be a UDTV, or any other type of UD display device (e.g., monitor, video panel, HUD, smart telephone, tablet device, video device, gaming device, etc.).

The second device 56 may be any of a variety of centralized or decentralized computing devices, image or video transmission devices. For example, the second device 56 may be a multimedia computer, a tablet, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, BDP, a recording device, such as a camera or video camera, or a combination thereof. In another example, the second device 56 may be a signal receiver for receiving broadcast or live stream signals, such as a television receiver, STB, a cable box, a satellite dish receiver, or a web enabled device.

The second device 56 may be centralized in a single room, distributed across different rooms, distributed across different geographical locations, embedded within a telecommunications network, etc. The second device 56 may have a means for coupling with the communication path 54 to communicate with the first device 52.

For illustrative purposes, the electronic system 50 is described with the second device 56 as a computing device, although it is understood that the second device 56 may be different types of devices. Also, for illustrative purposes, the display system 50 is shown with the second device 56 and the first device 52 as end points of the communication path 54, although it is understood that the display system 50 may have a different partition between the first device 52, the second device 56, and the communication path 54. For example, the first device 52, the second device 56, or a combination thereof may also function as part of the communication path 54.

The communication path 54 may be a variety of networks. For example, the communication path 54 may include wireless communication, wired communication, optical, ultrasonic, or the combination thereof. Satellite communication, cellular communication, BLUETOOTH®, Infrared Data Association standard (IrDA), wireless fidelity (WiFi), and worldwide interoperability for microwave access (WiMAX) are examples of wireless communication that may be included in the communication path 54. Ethernet, digital subscriber line (DSL), fiber to the home (FTTH), high-definition multimedia interface (HDMI) cable, and plain old telephone service (POTS) are examples of wired communication that may be included in the communication path 54.

Further, the communication path 54 may traverse a number of network topologies and distances. For example, the communication path 54 may include direct connection, personal area network (PAN), local area network (LAN), metropolitan area network (MAN), wide area network (WAN), or a combination thereof.

Figure 2:
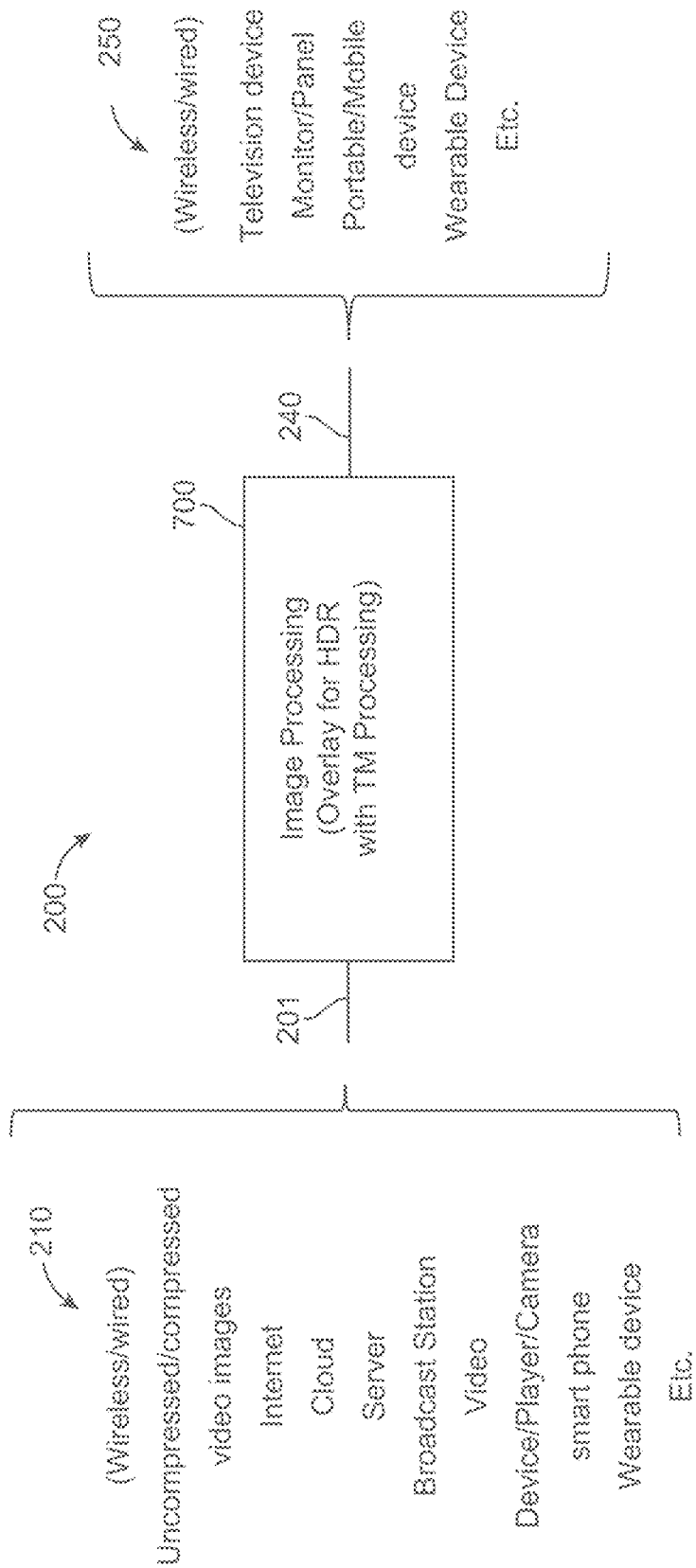
FIG. 2 shows an example high-level block diagram of a system, according to some embodiments.

FIG. 2 shows a high-level block diagram of a system 200, according to some embodiments. In some embodiments, the system 200 may process input video images from an input source 210 (or device 52 or 56, FIG. 1) received at an input node 201 (e.g., from the communication path 54, FIG. 1) using an overlay enhancement processor 700 (e.g., an integrated circuit (IC), hardware circuitry, a multi-core processor, an application specific IC (ASIC), CPU, hybrid device and application programming interface (API), etc.), output video images at the output node 240 (e.g., to the communication path 54) and display the images on an output source 250 (or device 52, FIG. 1). In some embodiments, the display for an output source 250 may be a physical device for presenting the image or multi-media presentations. For example, the display may be a screen, including a liquid crystal display (LCD) panel, a plasma screen, a projection screen, a heads-up-display (HUD), etc. In other embodiments, the display may be projected on an object or reflection device.

In some embodiments, the input video images may be provided from an input source 210, which may be transmitted/received wirelessly or through a wired interface (e.g., the communication path 54, FIG. 1) and may include uncompressed/compressed video content. In some embodiments, wireline or wireless communication of video imaging content in system 200 may include communication on/over one or more of a Ethernet, telephone (e.g., POTS), cable, powerline, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1× enhanced voice-data only (EV-DO) or 1× EV-DO Gold Multicast) system, an IEEE 802.11x system, a DMB (Digital Multimedia Broadcasting) system, an orthogonal frequency division multiple access (OFDM) system, a DVB-H (Digital Video Broadcasting-Handheld) system, etc.

In some embodiments, the video input source 210 may be transmitted over a wireless network (e.g., Internet, local area network (LAN, wide-area network (WAN), personal area network (PAN), campus wireless network (CAN), metropolitan area network (MAN), etc., e.g., the communication path 54, FIG. 1). The input source 210 may arise from a cloud-based system, a server, a broadcast station, a video device/player, a video camera, a mobile device, etc.

In some embodiments, the video image input from the input source may be decoded/encoded (e.g., via a decoder/encoder) prior to arriving at the input node 201. The video image output from the output node 240 to an output source 250 may be encoded/decoded prior to arriving at the output node 240. In some embodiments, the output source 250 may receive the output image from the output node 240 wirelessly or through a wire interface.

In some embodiments, compressed video image content from an input source 210 may provide analog or digital video from a broadcast, computer network, a DVD or other computer readable storage medium, or any other suitable source of video signals. In one embodiment, the compressed video from an input source 210 may be coupled to a receiver via a radio frequency interface (such as ATSC broadcasts), a computer network, or a wired or wireless connection such as a component video cable, a DVI or HDMI video interface, etc. In one embodiment, an uncompressed video image from an input source 210 may include one or more of a video camera, or a memory device such as a disk drive coupled to a receiver by any suitable video interface. The uncompressed video from an input source 210 may provide uncompressed video in analog or digital form including in the form of luminance and chrominance, in individual color intensities such as red, green and blue, etc., or in any other suitable format.

In some embodiments, digital video formats for input video content from an input source 210 may include different frame rates, different numbers of lines and rows of pixels, interlaced and non-interlaced, etc. For example, movies are typically produced at 24 fps (frames per second) format, NTSC is 30 frames per second and PAL is 25 frames per second. The format may be interlaced or progressive. For example, high definition formats (such as supported by digital video broadcast standards) may be modified to a format that fits the format of a display device of an output source 250. The display device of an output source 250 may be configured to receive NTSC, PAL, ATSC, DVB/T, etc.), or display device running at frame rates, such as 70 Hz, 75 Hz, 80 Hz, etc.

In some embodiments, a processor (e.g., overlay enhancement processor 700, FIG. 2, FIG. 7, processor 1001, FIG. 10) may perform the following. A control signal may be received from an input data stream indicating whether a graphic is being overlaid on image data for an HDR scene. A video stream corresponding to a video signal may be acquired. Based on the control signal, the processor may process the video stream using either a first TM function (e.g., a dynamic TM function) to generate a first tone mapped video, or a second tone mapping function (e.g., an adaptive TM function) to generate a second tone mapped video.

The first TM function is used when a graphic is not being overlaid. The first TM function uses TM metadata for only the HDR scene (i.e., and not the graphic overlay). The second TM function is used when a graphic is being overlaid. The second TM function uses TM metadata for the overlaid graphic and TM metadata for the HDR scene. The TM metadata for the overlaid graphic is obtained by estimating a maximum luminance for all values of the input data stream that includes the graphic overlaid on the HDR scene. In some embodiments, an overlay flag input specifies whether the graphic is being overlaid on image data (e.g., the image data for the HDR scene). In some embodiments, the overlaid graphic may correspond to image data for a picture-in-picture (PIP) data stream. The maximum luminance represents a maximum value of max(R,G,B) of pixels in the video stream.

Figure 3:
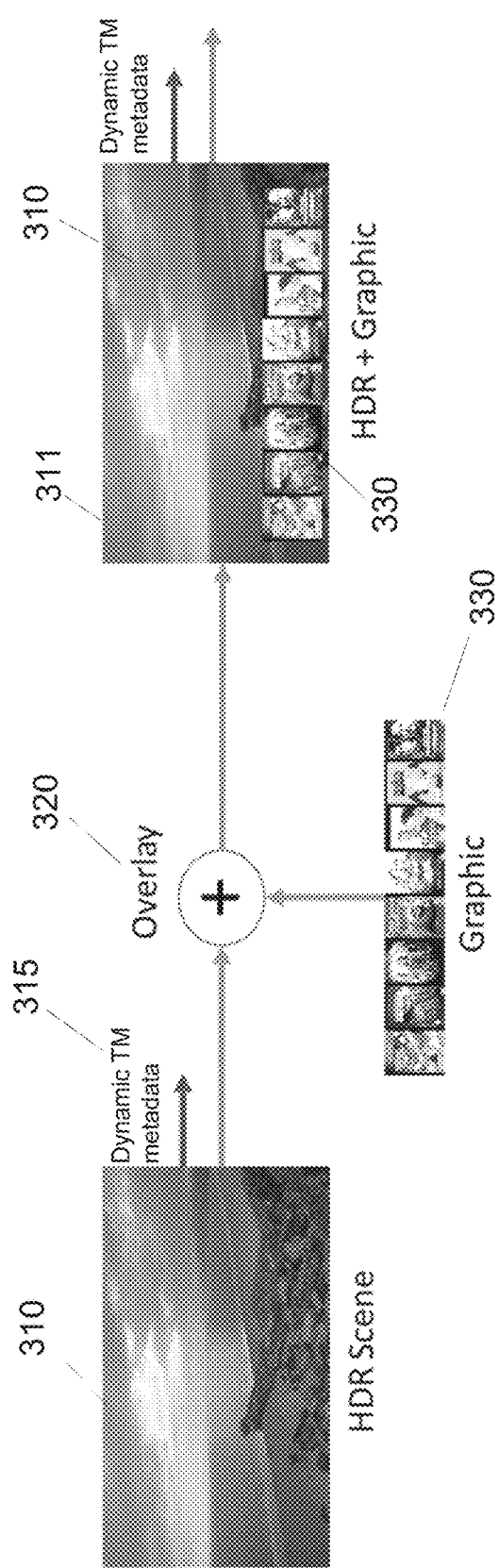
FIG. 3 shows an example graphic overlaid on a High Dynamic Range (HDR) scene.

FIG. 3 shows an example graphic 330 overlaid on an HDR scene 310. A graphic 330 can be overlaid using an overlay 320 function applied to the HDR scene 310 having dynamic TM metadata 315 at, for example, a BDP, an STB, or Broadcaster. The result 311 is the HDR scene 310 with the overlaid graphic 330. However, no information about the overlaid graphic 330 is currently delivered together with HDR scene 310 to a receiver, where TM application is occurring.

Figure 4:
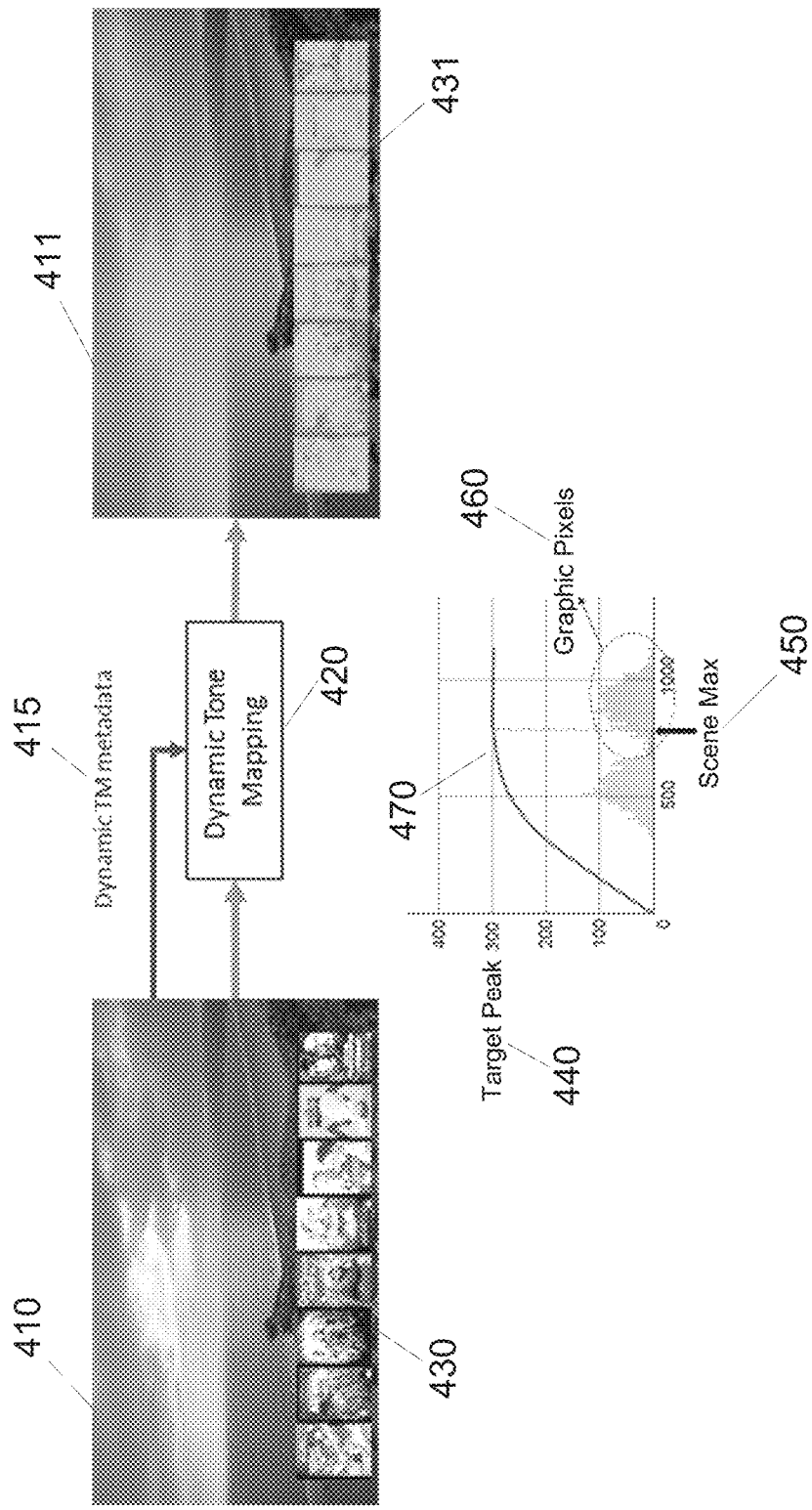
FIG. 4 shows an example graphic overlaid on an HDR scene with dynamic tone mapping (TM) applied.

FIG. 4 shows an example graphic 430 overlaid on an HDR scene 410 with dynamic TM 420 applied. The HDR scene 410 is shown having dynamic TM metadata 415. When the dynamic TM 420 is applied to the HDR scene 410 using the dynamic TM metadata 415, since the dynamic TM metadata 415 only contains metadata of the HDR scene 410, the dynamic TM result of the overlaid graphic 430 is uncertain. A problem that occurs is that serious clipping happens to the graphic pixels whose values are greater than max(scene luminance) 450. The results are that while the HDR scene 411 shows the overlaid graphic 431 having a poor result from the dynamic TM 420. The graph shows the target peak 440, luminance for graphic pixels 460 and the curve 470 showing the clipping.

Figure 5:
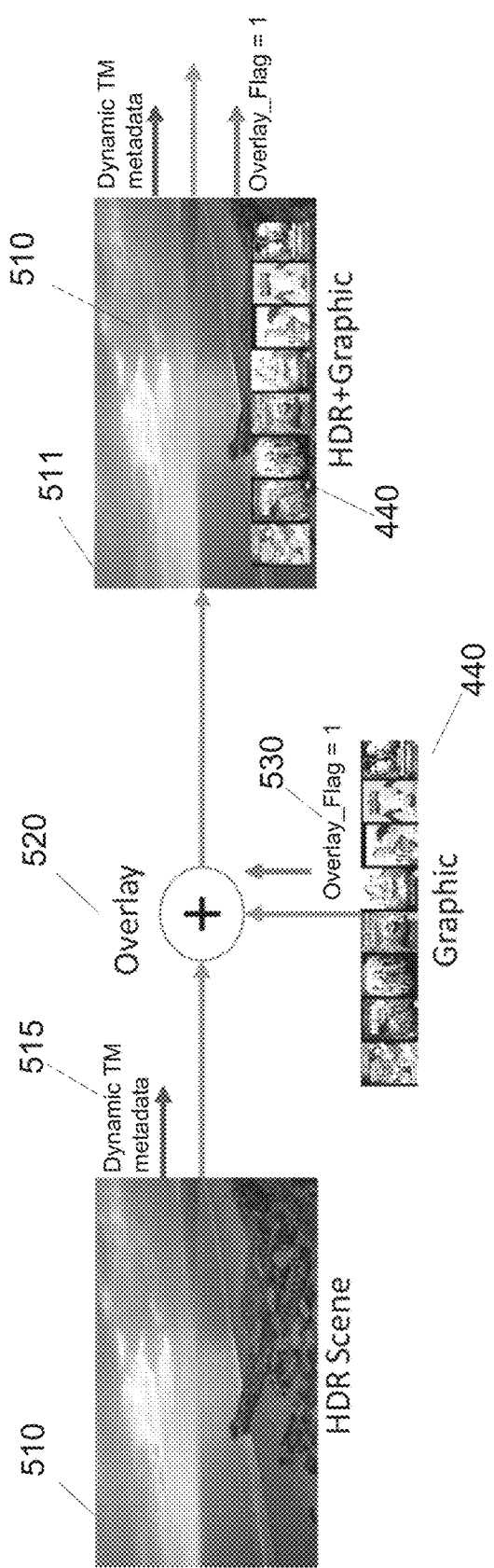
FIG. 5 shows an example graphic overlaid on an HDR scene with an overlay indication applied, according to some embodiments.

FIG. 5 shows an example 511 of a graphic 440 overlaid on an HDR scene 510 with an overlay indication 530 applied, according to some embodiments. The HDR scene 510 includes the dynamic TM metadata 515 that is applied to the overlay function 520. To resolve the clipping issue, some embodiments provide for the device (e.g., a BDP, an STB, Broadcaster, etc.) to send an overlay indication 530, such as an overlay_flag, bit map, signal, etc. when a graphic is overlaid by the TV device, receiver, etc. In one example, an "Overlay_flag may be set=1 to represent that a graphic is overlaid by the device.

Figure 6:
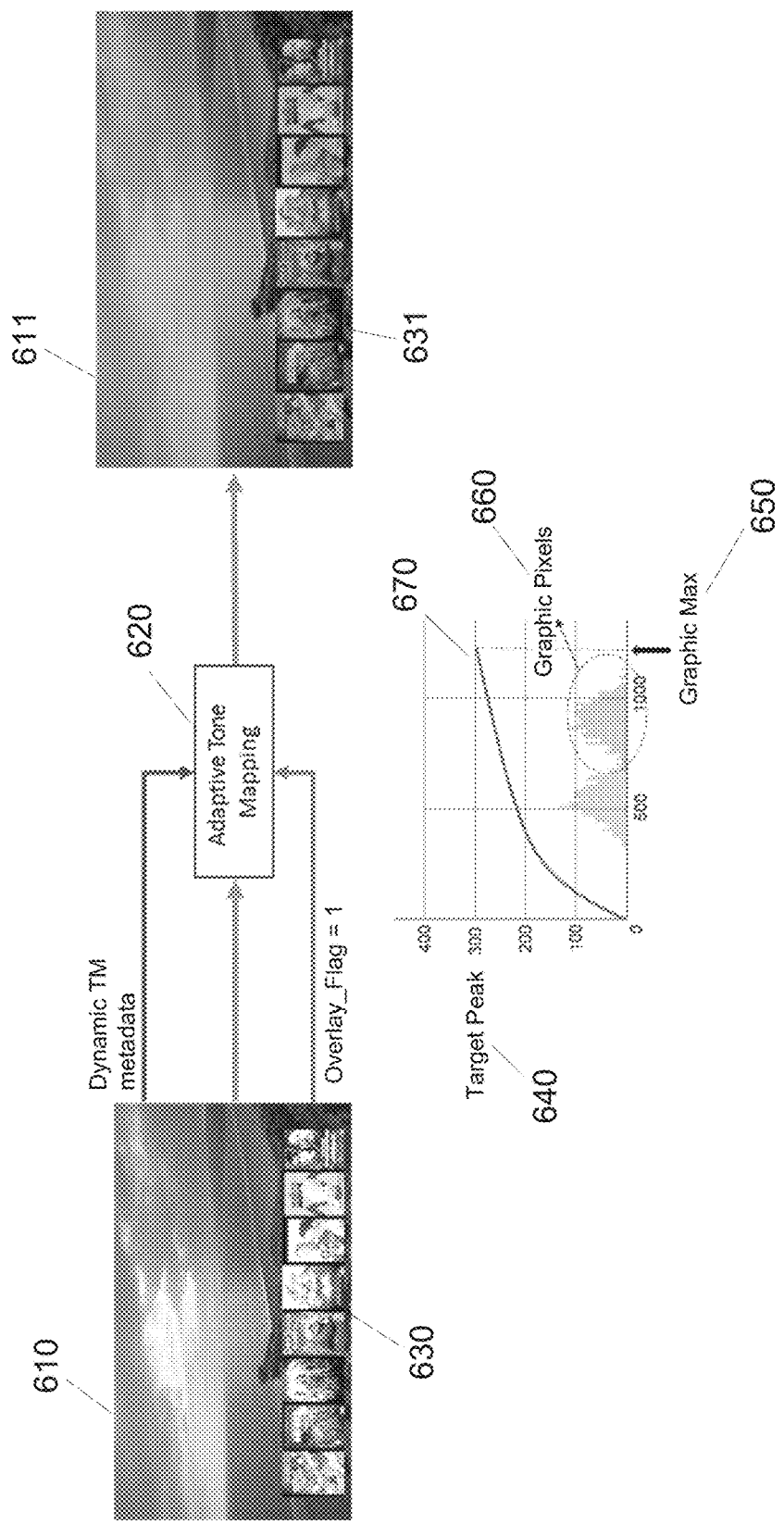
FIG. 6 shows an example graphic overlaid on an HDR scene with an overlay indication applied with adaptive TM applied, according to some embodiments.

FIG. 6 shows an example graphic 630 overlaid on an HDR scene 610 with an overlay indication (e.g., Overlay_Flag=1) sent with adaptive TM 620 applied, according to some embodiments. If the receiver receives the overlay indication (e.g., Overlay_Flag=1), then graphic adaptive TM 620 renders the graphic 631 part of the HDR scene 611 properly after the adaptive TM 620. The graph shows the target peak 640, the graphic max (graphic luminance) 650 for graphic pixels 660. The curve 670 shows the clipping issue (e.g., in FIG. 4) resolved.

Figure 7:
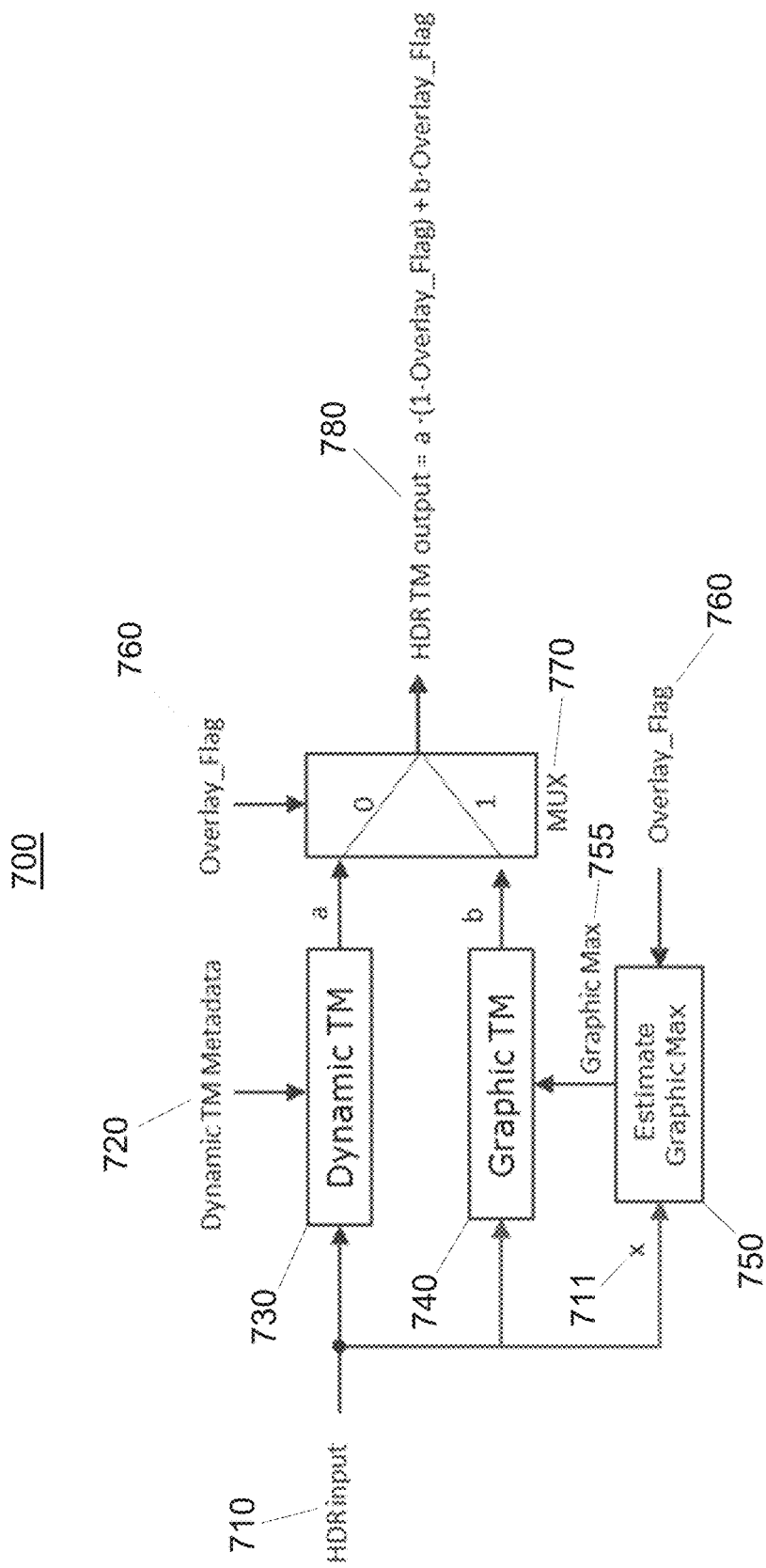
FIG. 7 shows a block diagram for graphic overlay processing for inserting an overlay indication for graphic overlays of HDR scenes and TM function application, according to some embodiments.

FIG. 7 shows a block diagram for graphic overlay processing 700 for inserting an overlay indication 760 (e.g., an Overlay_Flag, control signal, bitmap, etc.) for graphic overlays of HDR scenes and TM function application, according to some embodiments. For the graphic overlay processing 700, the HDR scene input 710 is received along with dynamic TM metadata 720 and the overlay indication 760. In some embodiments, the HDR scene input 710 and dynamic TM metadata 720 are provided to the dynamic TM function 730 to result in the output a; and the estimate graphic max function 750 estimates the graphic max (graphic luminance) taking in the overlay graphic x 711 and the overlay indication 760. The Graphic max 755 is input to the graphic TM function 740 that results in the output b. In some embodiments, the outputs a and b and the overlay indication 760 are input to the multiplexor (MUX) 770, where the HDR TM output 780=a (1−Overlay_Flag)+b (Overlay_Flag). Note that the Graphic max 755 value may be estimated in a receiver where Graphic max=max(x, Scene Max) for all values of x 711 in the input scene. In some embodiments, the estimate Graphic max 750 block provides processing only when the overlay indication 760 is set (e.g., Overlay_Flag=1). The Graphic max 755 equals the scene max when the overlay indication is not set (e.g., Overlay_Flag=0). In some embodiments, an infinite impulse response (IIR) filtering scheme may be combined with the estimate Graphic max function 750.

Figure 8:
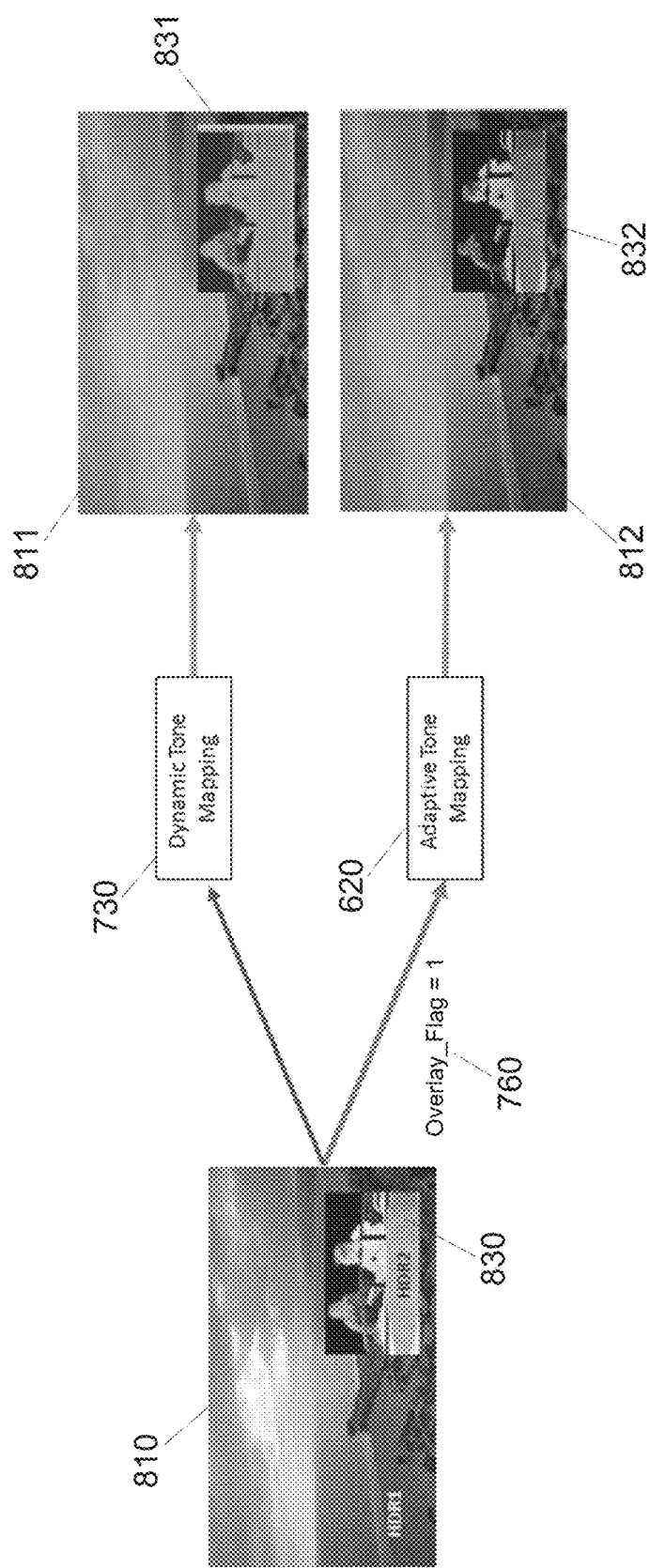
FIG. 8 shows an example graphic overlaid on an HDR scene with dynamic TM applied for no overlay indication and adaptive TM applied for an overlay indication, according to some embodiments.

FIG. 8 shows an example graphic 830 overlaid on an HDR scene 810, where dynamic TM 730 is applied for no overlay indication and adaptive TM 620 is applied for an overlay indication 760, according to some embodiments. PIP is common video processing at an STB or TV broadcasters. When two HDR contents are mixed as with PIP, a practical choice is to send the dynamic metadata of the main HDR picture. In this case, then the clipping problem may occur for the HDR content in the sub-picture (i.e., the PIP scene 831 in the HDR scene 811). In some embodiments, the overlay indication 760 may be used for applying an adaptive TM 620 function to result in the PIP scene 832 in the HDR scene 812.

In some embodiments, the overlay indication 760 may be transmitted in a control signal and received from an input data stream indicating whether a sub-scene (PIP 830) is being overlaid on image data for an HDR scene 810. A video stream corresponding to a video signal may be acquired. Based on the control signal and overlay indication 760, the processor for graphic overlay processing 700 may process the video stream using either a first TM function (e.g., a dynamic TM function 730) to generate a first tone mapped video HDR scene 811, or a second tone mapping function (e.g., an adaptive TM function 620) to generate a second tone mapped video HDR scene 812.

In some embodiments, the first TM function is used when a graphic is not being overlaid. The first TM function (e.g., the dynamic TM function 730) uses TM metadata for only the HDR scene 810. The second TM function (e.g., the adaptive TM function 620) is used when a graphic is being overlaid. The second TM function uses TM metadata for the overlaid graphic and TM metadata for the HDR scene. The TM metadata for the overlaid graphic is obtained by estimating a maximum luminance for all values of the input data stream that includes the graphic 830 overlaid on the HDR scene 810.

Figure 9:
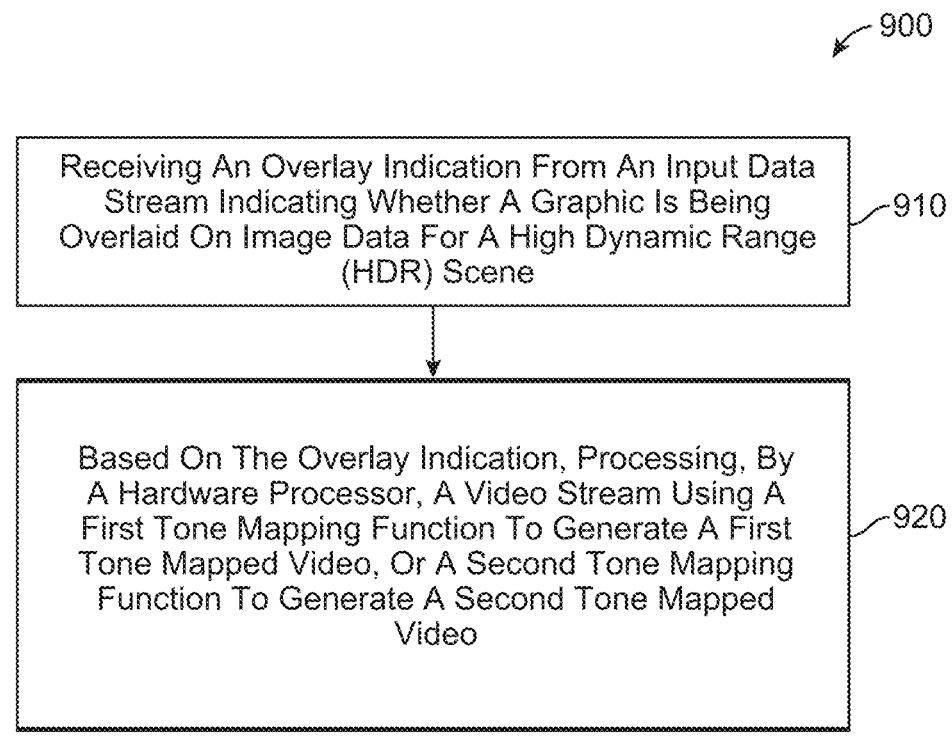
FIG. 9 shows a block diagram for overlay processing for HDR scenes with TM applications, according to some embodiments.

FIG. 9 shows a block diagram for a process 900 for overlay processing for HDR scenes with TM applications, according to some embodiments. In block 910, an overlay indication (e.g., an overlay flag, a bitmap, a control signal, etc.) is received from an input data stream indicating whether a graphic is being overlaid on image data for an HDR scene. In block 920, based on the overlay indication, a hardware processor (e.g., overlay enhancement processor 700, FIG. 2, FIG. 7, processor 1001, FIG. 10) processes a video stream using a first tone mapping function (e.g., a dynamic TM function) to generate a first tone mapped video, or a second tone mapping function (e.g., an adaptive TM function) to generate a second tone mapped video.

In some embodiments, in process 900 the first tone mapping function is used when a graphic is not being overlaid on the HDR scene, and the first tone mapping function uses tone mapping metadata for only the HDR scene. In some embodiments, in process 900 the second tone mapping function is used when a graphic is being overlaid on the HDR scene, and the second tone mapping function uses tone mapping metadata for the graphic being overlaid and tone mapping metadata for the HDR scene. In some embodiments, in process 900 the second tone mapping function is used when the graphic is being overlaid on the image data for the HDR scene, and the second tone mapping function uses tone mapping metadata for the HDR scene with the overlaid graphic.

In some embodiments, in process 900 the tone mapping metadata for the graphic being overlaid is obtained by estimating a maximum luminance for all values of the input data stream that includes the graphic overlaid on the HDR scene. In process 900, the overlay indication may include an overlay flag that specifies whether the graphic is being overlaid on image data.

In some embodiments, in process 900 the graphic being overlaid corresponds to image data for a picture-in-picture data stream. In process 900, the maximum luminance represents a maximum value of max(R,G,B) of pixels in the video stream.

Figure 10:
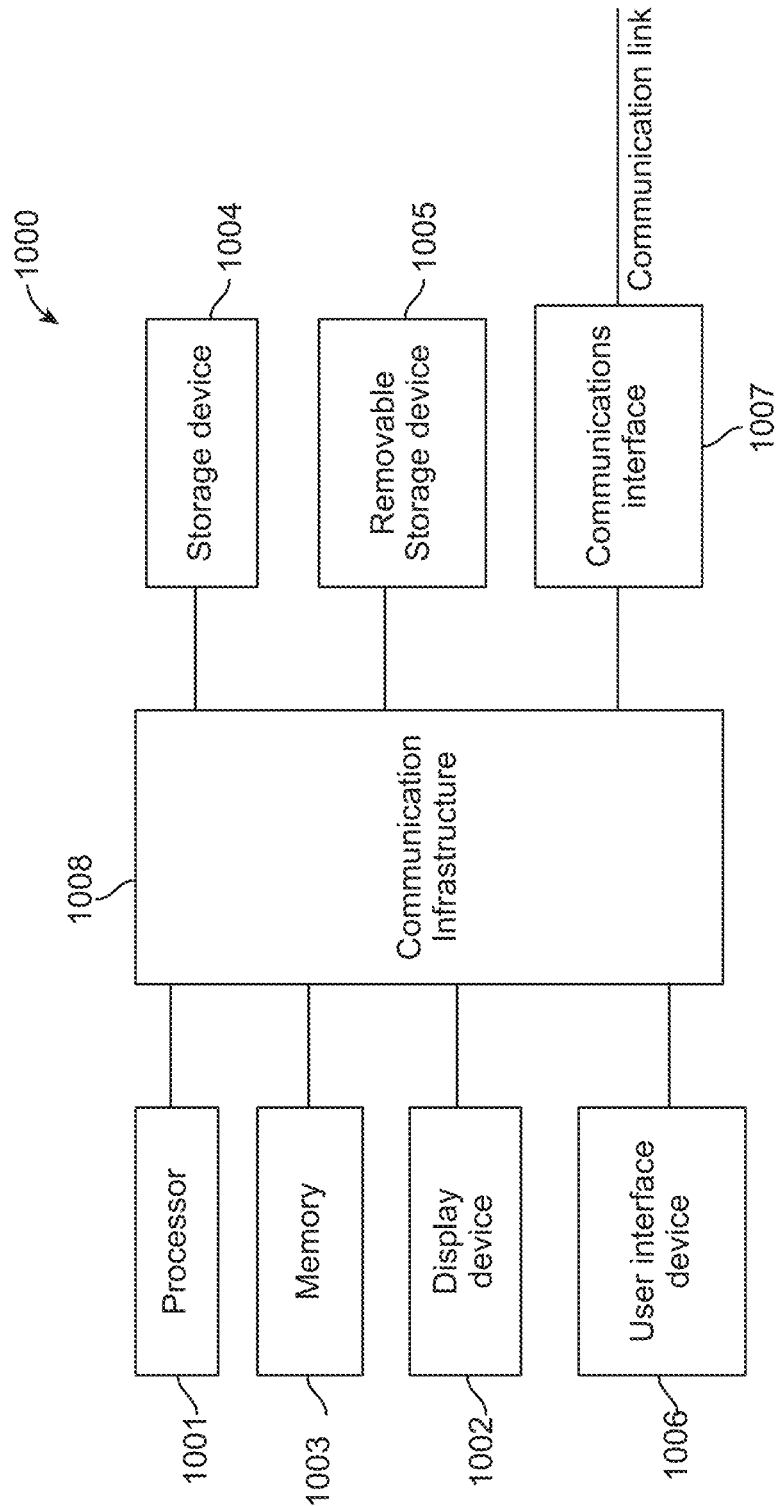
FIG. 10 is an exemplary high-level block diagram showing an information processing system comprising a computer system useful for implementing disclosed embodiments.

FIG. 10 is a high-level block diagram showing an information processing system comprising a computer system 1000 useful for implementing the disclosed embodiments. Computer system 1000 may be incorporated in a device 52, 56, FIG. 1, or devices 210 or 250, FIG. 2). The computer system 1000 includes one or more processors 1001 (e.g., processor(s) 700, FIG. 2), and can further include an electronic display device 1002 (for displaying video, graphics, text, and other data), a main memory 1003 (e.g., random access memory (RAM)), storage device 1004 (e.g., hard disk drive), removable storage device 1005 (e.g., removable storage drive, removable memory module, a magnetic tape drive, optical disk drive, computer readable medium having stored therein computer software and/or data), user interface device 1006 (e.g., keyboard, touch screen, keypad, pointing device), and a communication interface 1007 (e.g., modem, a network interface (such as an Ethernet card), a communications port, or a PCMCIA slot and card). The communication interface 1007 allows software and data to be transferred between the computer system and external devices (e.g., over communication path 54, FIG. 1). The system 1000 further includes a communications infrastructure 1008 (e.g., a communications bus, cross-over bar, or network) to which the aforementioned devices/modules 1001 through 1007 are connected.

Information transferred via communications interface 1007 may be in the form of signals such as electronic, electromagnetic, optical, or other signals capable of being received by communications interface 1007, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

In some embodiments, processing instructions for 700 (FIG. 7) may be stored as program instructions on the memory 1003, storage device 1004 and the removable storage device 1005 for execution by the processor 1001.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method for video tone mapping, comprising:
receiving, by a hardware processor, an overlay indication from an input data stream;
determining, by the hardware processor, whether or not the overlay indication indicates that a graphic is being overlaid on image data for a High Dynamic Range (HDR) scene in an HDR video stream; and
based on the overlay indication, processing, by the hardware processor, the HDR video stream using: 1) a first tone mapping function to generate a first tone mapped video when the overlay indication is determined to indicate that the graphic is not being overlaid, or 2) a second tone mapping function to generate a second tone mapped video when the overlay indication is determined to indicate that the graphic is being overlaid.

2. The method for video tone mapping of claim 1, wherein the first tone mapping function uses tone mapping metadata for only the HDR scene without the overlaid graphic.

3. The method for video tone mapping of claim 1, wherein the second tone mapping function uses tone mapping metadata for the HDR scene with the overlaid graphic.

4. The method for video tone mapping of claim 3, wherein the tone mapping metadata for the HDR scene with the overlaid graphic is obtained by estimating a maximum luminance for all values of the HDR video stream that includes the graphic overlaid on the HDR scene.

5. The method for video tone mapping of claim 4, wherein the maximum luminance represents a maximum value of max(R,G,B) of pixels in the HDR video stream.

6. The method for video tone mapping of claim 1, wherein the overlay indication comprises an overlay flag that specifies whether the graphic is being overlaid on the image data for the HDR scene.

7. The method for video tone mapping of claim 1, wherein the graphic being overlaid corresponds to image data for a picture-in-picture data stream.

8. An apparatus comprising:
a memory storing instructions; and
at least one processor executing the instructions including a process configured to:
receive an overlay indication from an input data stream;
determine whether or not the overlay indication indicates that a graphic is being overlaid on image data for a High Dynamic Range (HDR) scene in an HDR video stream; and
based on the overlay indication, process the HDR video stream using: 1) a first tone mapping function to generate a first tone mapped video when the overlay indication is determined to indicate that the graphic is not being overlaid, or 2) a second tone mapping function to generate a second tone mapped video when the overlay indication is determined to indicate that the graphic is being overlaid.

9. The apparatus of claim 8, wherein the first tone mapping function uses tone mapping metadata for only the HDR scene without the overlaid graphic.

10. The apparatus of claim 8, wherein the second tone mapping function uses tone mapping metadata for the HDR scene with the overlaid graphic.

11. The apparatus of claim 10, wherein the tone mapping metadata for the HDR scene with the overlaid graphic is obtained by estimating a maximum luminance for all values of the HDR video stream that includes the graphic overlaid on the HDR scene.

12. The apparatus of claim 11, wherein the maximum luminance represents a maximum value of max(R,G,B) of pixels in the HDR video stream.

13. The apparatus of claim 8, wherein the overlay indication comprises an overlay flag that specifies whether the graphic is being overlaid on the image data for the HDR scene.

14. The apparatus of claim 8, wherein the graphic being overlaid corresponds to image data for a picture-in-picture data stream.

15. A non-transitory processor-readable medium that includes a program that when executed by a processor performs a method comprising:
receiving, by a hardware processor, an overlay indication from an input data stream;
determining, by the hardware processor, whether or not the overlay indication indicates that a graphic is being overlaid on image data for a High Dynamic Range (HDR) scene in an HDR video stream; and
based on the overlay indication, processing, by the hardware processor, the HDR video stream using: 1) a first tone mapping function to generate a first tone mapped video when the overlay indication is determined to indicate that the graphic is not being overlaid, or 2) a second tone mapping function to generate a second tone mapped video when the overlay indication is determined to indicate that the graphic is being overlaid.

16. The non-transitory processor-readable medium of claim 15, wherein the first tone mapping function uses tone mapping metadata for only the HDR scene without the overlaid graphic.

17. The non-transitory processor-readable medium of claim 15, wherein:
the second tone mapping function uses tone mapping metadata for the HDR scene with the overlaid graphic; and
the tone mapping metadata for the HDR scene with the overlaid graphic is obtained by estimating a maximum luminance for all values of the HDR video stream that includes the graphic overlaid on the HDR scene.

18. The non-transitory processor-readable medium of claim 17, wherein the maximum luminance represents a maximum value of max(R,G,B) of pixels in the HDR video stream.

19. The non-transitory processor-readable medium of claim 15, wherein the overlay indication comprises an overlay flag that specifies whether the graphic is being overlaid on the image data for the HDR scene.

20. The non-transitory processor-readable medium of claim 15, wherein the graphic being overlaid corresponds to image data for a picture-in-picture data stream.

* * * * *